Figure 1:
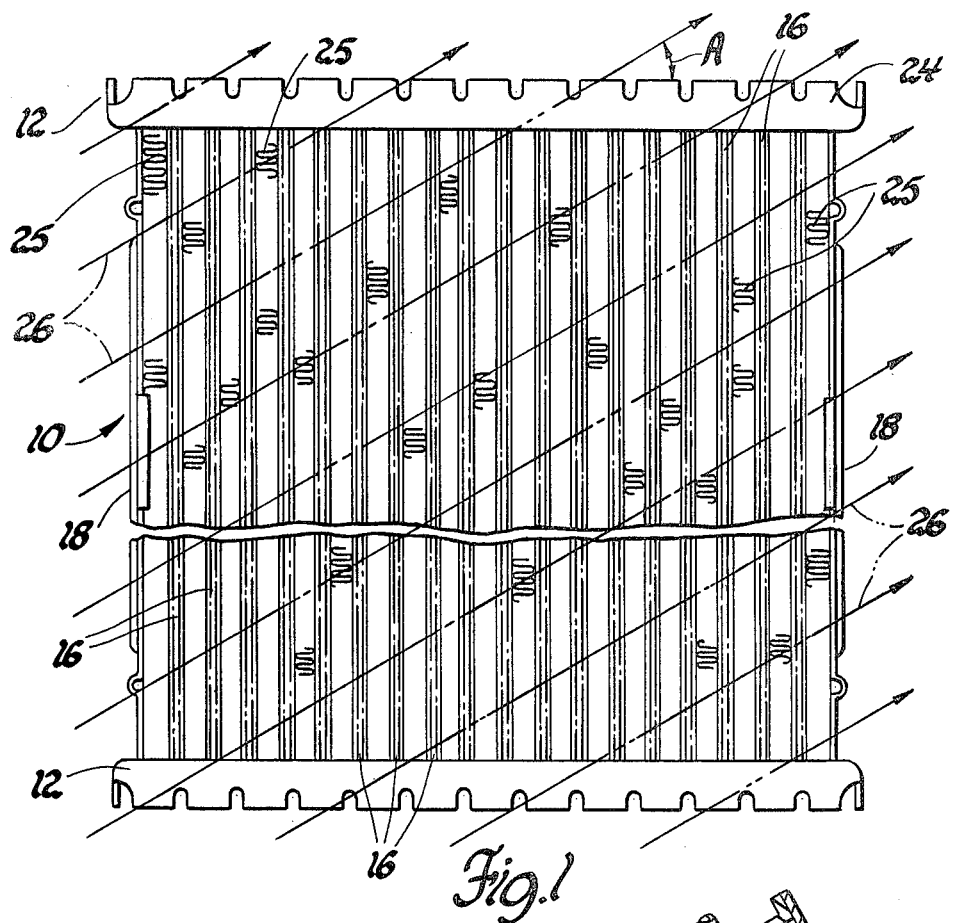

United States Patent [19]

Jacovides et al.

[11] 4,443,678

[45] Apr. 17, 1984

[54] METHOD OF INDUCTION BRAZING A COMPLEX ASSEMBLY

[75] Inventors: Linos J. Jacovides, Birmingham, Mich.; Edward J. Woods, Mentor, Ohio

[73] Assignee: General Motors Corporation, Detroit, Mich.

[21] Appl. No.: 419,941

[22] Filed: Sep. 20, 1982

[51] Int. Cl.³ .............................................. H05B 5/06
[52] U.S. Cl. .................................. 219/10.41; 219/8.5; 219/9.5; 219/10.53; 219/10.75
[58] Field of Search ............... 219/9.5, 8.5, 7.5, 10.41, 219/10.49, 10.53, 10.57, 10.67, 10.69, 85 A, 85 BA

[56] References Cited

U.S. PATENT DOCUMENTS

| | | | |
|---|---|---|---|
| 2,448,690 | 9/1948 | Storm | 219/9.5 |
| 2,684,425 | 7/1954 | Vickland | 219/9.5 |
| 2,902,572 | 9/1959 | Lackner et al. | 219/10.41 |
| 3,251,976 | 5/1966 | McBrien | 219/10.69 |

FOREIGN PATENT DOCUMENTS 385285 1/1933 United Kingdom .

Primary Examiner—Roy N. Envall, Jr.
Assistant Examiner—M. M. Lateef
Attorney, Agent, or Firm—Warren D. Hill

[57] ABSTRACT

A heat exchanger assembly is formed of spaced parallel headers connected by an array of spaced flat tubes each in a plane perpendicular to the headers. The header and tube material is clad with a brazing alloy which melts at a temperature slightly below the melting point of the base material. Sinuous metallic ribbons fill the spaces between the flat tubes. The assembly is induction heated by a low frequency alternating magnetic field having its flux lines extending transversely of the tubes and headers and at oblique angles thereto, the angles being selected to cause equal heating thereof for obtaining a uniform temperature throughout the assembly to effect the melting of the alloy and the brazing of the joints. Heat panels heated by the magnetic field to a temperature near that of the assembly are placed opposite outer surfaces of the assembly as required to avoid a radiation loss which would cause a significant temperature differential.

7 Claims, 4 Drawing Figures

U.S. Patent    Apr. 17, 1984    4,443,678

METHOD OF INDUCTION BRAZING A COMPLEX ASSEMBLY

This invention relates to a method of induction brazing and more particularly to such a method which is applicable to a complex assembly having elements to be joined lying in transverse planes.

In the manufacture of heat exchangers, for example those such as heater cores used in automotive vehicles, the various elements of the assembly such as headers, tubes and fins are joined by brazing. The joints between the tubes and headers must be leakproof even after extensive usage in a harsh environment. Typically, the brazing material is an alloy clad on the core stock comprising the tubes and headers and during the brazing operation the alloy material melts at a temperature a few degrees lower than the melting temperature of the core material. Thus, the brazing method requires accurate temperature control and very uniform heating of the assembly to fuse only the brazing alloy and perfect the joints of the assembly. Prior to the present invention, the methods used for brazing the heat exchangers were energy inefficient and required very expensive complicated equipment. In some cases extra measures were required to avoid environmental contamination by the brazing process. As a result of these factors the manufacture of heat exchanger assemblies have become unduly expensive.

According to this invention it is proposed to use induction heating for the heat exchanger brazing operation so that the parts might be heated directly to maximize energy utilization and to use relatively inexpensive equipment. Heretofore induction heating has been applied commercially to articles of very simple configuration such as heat treating rods or bonding coaxial tubes. Usually the magnetic field used for inductive heating can be applied symmetrically so that the surfaces of the parts requiring heating can receive equal energy inputs. In the case of complex assemblies, however, as typified by the heat exchanger with major elements on different transverse planes, the symmetrical application of magnetic fields to the assembly results in uneven heating so that some portions become too hot and other portions not hot enough to properly braze the joints.

It is therefore an object of the invention to provide a method of induction brazing a complex assembly.

This invention is carried out by establishing an alternating magnetic field having a uniform flux pattern extending in a given direction, placing in that field an assembly having elements disposed in at least two transverse planes intersecting at a junction wherein the elements include core metal clad with a brazing metal, orienting the field with respect to the assembly so that the flux lines thereof extend transverse of the planes of the elements at oblique angles to the elements to cause substantially equal inductive heating of the elements, and inductively heating the elements to a uniform temperature sufficient to melt the cladding to form brazed joints and insufficient to melt the core metal. The invention further comprehends the use of a low frequency alternating magnetic field for the inductive heating of the assembly so that uniform heating occurs within each of the elements.

Figure 2:
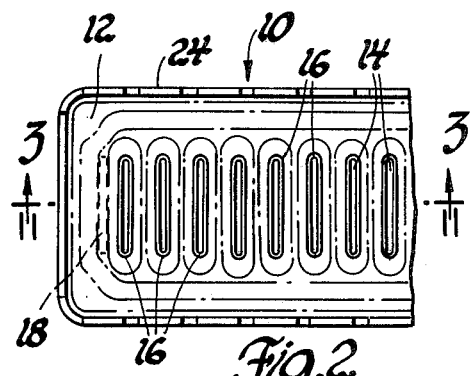
Figure 3:
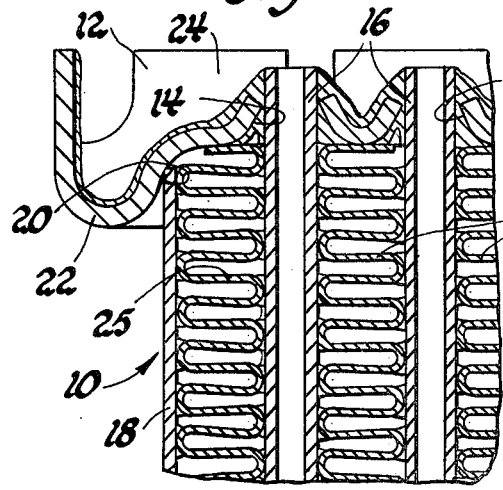
Figure 4:
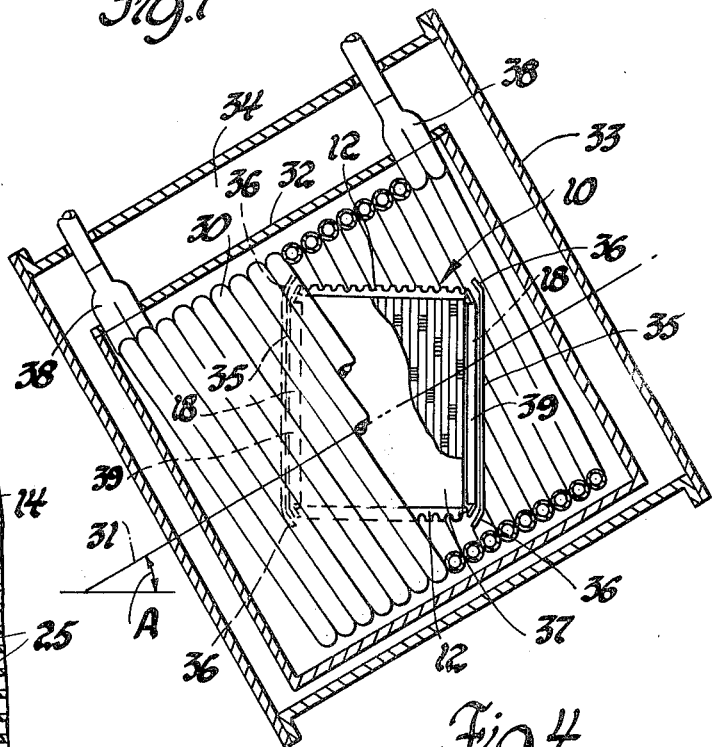

The above and other advantages will be made more apparent from the following specification taken in conjunction with the accompanying drawings wherein like reference numerals refer to like parts and wherein FIG. 1 is a side view of a heat exchanger assembly to be brazed according to the method of the invention, FIG. 2 is a partial top view of the heat exchanger of FIG. 1, FIG. 3 is a partial cross-sectional view of the heat exchanger taken along line 3—3 of FIG. 2, and FIG. 4 is a sectional view of an induction heating apparatus for carrying out the method of the invention and a heat exchanger positioned within the apparatus.

FIGS. 1, 2 and 3 of the drawings illustrate an aluminum heat exchanger which is used herein as an example of how the method of the invention may be applied. The many joints of the heat exchanger which must be leakproof require the use of a joining process which can be carefully controlled to provide a sound joint at every connection. Vacuum brazing is such a method.

The heat exchanger 10 shown in FIGS. 1, 2 and 3 comprises a pair of spaced parallel headers 12 each of which although not entirely flat lies primarily in a plane and each header has an array of transverse parallel elongated openings 14 which receive the ends of flat tubes 16 that extend in planes perpendicular to the planes of the header 12. The tubes extend between the two headers and are to be joined to the headers by brazing. A pair of side plates 18 one on each outer side surface of the heat exchanger extends between the headers 12 in a direction parallel to the tubes 16 and spaced from the nearest tube 16 by an amount equal to the separation between the tubes 16. The upper and lower ends of the side plate 18 abut against a shoulder 20 of the header which is defined by a peripheral rim 22 formed in the header. Side walls 24 normal to the general plane of the header comprise the periphery thereof and are used to attach a reservoir, not shown, to the portion of the heat exchanger described and illustrated herein. The attachment is made by crimping the wall 24 inwardly against a portion of the reservoir. The spaces between the tubes 16 and between the outer tube 16 and the side wall 18 contain fins 25 comprising sinuous ribbons of metal making contact with the tubes and side walls, respectively, and are to be brazed at the points of contact to assure good thermal conductivity.

The headers 12 are approximately 6.75 inches long by 2 inches wide. Each tube 16 is 9.5 inches long and has an internal opening of 0.9 inch by 0.08 inch. A total of 18 tubes are used spaced on 0.33 inch centers. The ribbon is about 1 inch wide and is formed sinuously to comprise 30 fins per inch, each fin extending predominantly parallel to the headers. The side plates are about 9 inches long and 1 inch wide. The headers, side plates and tubes are made of 3005 aluminum core material clad on one side-as required with 4047 aluminum-silicon brazing alloy. The thickness of the cladding comprises about 10% of the thickness of the stock. The sinuous ribbon is 5005 aluminum unclad. The stock thickness for the header is 0.05 to 0.08 inch, for the tube it is 0.010 to 0.015 inch, for the side wall it is 0.015 to 0.025 inch and for the ribbon it is 0.003 to 0.006 inch. The melting range for the core material 3005 aluminum is 1165° to 1170° F. and the melting range for the 4047 aluminum brazing alloy is 1070° to 1080° F.

In view of the above structure and the melting ranges of the materials involved it is essential that the brazing occur in the narrow temperature range between the melting points. The range is even further narrowed by the phenomenom that the brazing alloy attacks the aluminum core material at high temperatures and alloys with it. Thus the high part of the allowable temperature range should be avoided. In practice, brazing should occur at 1095° to 1120° F. Since the joints between the tubes and the headers must be leakproof, great care must be exercised in bringing those elements, that is, the headers and the tubes, to the correct temperature. It is desired that each bend of the sinuous ribbon be brazed to its adjoining tube or side wall, however this connection is less critical than the tube-to-header joints. Thus the tube-to-header joints have a higher priority. Ideally then, both the headers 12 and the tube 16 are simultaneously raised to the brazing temperature so that alloy cladding on each will fuse and flow into the tube-to-header joints to perfect those joints.

The conventional vacuum brazing practice of joining such assemblies has comprised indirectly heating the assemblies by radiant energy from electrical resistance heaters on either side of the assemblies. The assemblies must be heated slowly so that the radiant heat applied to the outer surfaces can flow throughout the assembly to bring it to a uniform temperature in the desired range. This practice requires an expensive heating apparatus and uses the electrical energy inefficiently.

It is proposed here to heat the heat exchanger assembly directly by induction heating. The traditional practice for inductively heating a part is to apply an alternating magnetic field to the part symmetrically. In this case, however, if the field were applied perpendicular to the plane of the tubes and parallel to the headers, the tubes would be heated at a much faster rate than the headers. On the other hand, if the field were applied perpendicular to the headers they would heat faster than the tubes. It has been found that by applying the field to the part asymmetrically so that it cuts transversely through the planes of the headers and the tubes both set of elements can be heated to the brazing temperature at the same rate if the proper angles of the magnetic field to the planes of the elements are maintained. As shown in FIG. 1, a uniform magnetic field comprising flux lines 26 extends through heat exchanger assembly 10 and the flux lines are tilted by an angle A with respect to the plane of the header 12. Once this principle is known the specific angle A for any given assembly can be determined empirically by treating the tubes 16 and sinuous ribbon fins 25 as a unit called a core block. Its temperature can be measured by thermocouple and the temperature of the header 12 is likewise measured. Trials at different angles quickly reveal the specific angle A which is appropriate for a uniform heating of the unit assembly. A noticeable temperature difference between the header and the core block occurs as the angle is changed by a degree. For the specific heat exchanger structure described above, the angle A is 19° if a single heat exchanger is inductively heated in the induction heating apparatus to be described. If, on the other hand, three heat exchangers are placed side by side, and steel heat panels are placed adjacent the outer surfaces of the outer core blocks to avoid unequal heat losses from the three assemblies, then an angle A of 24° is optimum.

FIG. 4 depicts an induction heating apparatus for heat exchangers 10 and is specifically described for a unit with the capacity for three heat exchangers 10 mounted side by side. It should be noted first of all, that the heat exchangers 10 are mounted with the headers in a horizontal plane. This minimizes the gravitational effect on the fused brazing alloy. If the headers were tilted a few degrees the alloy would tend to run down hill from the joints with the result of starving joints on the upside of the assembly. The coil 30 is tilted with its central axis 31 at an angle A to the horizontal to attain the proper angular relationship of the magnetic field to the assembly 10. The coil is surrounded by a flux return path 32 to intensify the magnetic field to make the field more uniform within the coil and to prevent losses by the linking of the field outside the coil with the walls of the chamber. The chamber 34, which is essentially a steel box with a door 33, surrounds both the coil and the flux return path. Vacuum pumping apparatus, not shown, is coupled to the chamber for drawing the chamber to a vacuum of 1–10 microns. As an alternative configuration the chamber may be made of a dielectric, such as quartz, and small enough to fit within the coil. Then the vacuum pumping obviously would be more efficient due to the smaller chamber volume. A particular coil to be used for the FIG. 4 embodiment has dimensions 8½ inches wide, 14¼ inches high and 15 inches deep. Thus the coil 30 is generally rectangular in cross-section but has appropriately rounded corners. The coil is constructed of copper tubing ⅜ inch outer diameter and having 0.060 inch wall thickness and is cooled by water circulating through the tubing. The tubing is wrapped in tape and covered with epoxy. The coil ends are coupled to the coil body by Y connections 38 so that the coil is double wound with 16 double turns. A current of 1400 amperes is applied to the coil.

The flux return path 32 in the form of a box surrounding the coil may be made up of iron laminations but the preferred material is a compacted powdered iron which has a permeability on the order of 130 and a high electrical resistance. The powdered iron flux return path around the coil has a thickness of 1 inch and is spaced ½ inch from the coil sides while the portions of the flux return path at the ends of the coil are adjacent the coil ends. The flux path material will not get hot so long as it is sufficiently thick to avoid saturation by the magnetic field. The flux return path efficiently channels the magnetic field outside the coil so that the field does not link with the walls of the chamber 34 to heat the chamber walls thereby introducing energy losses. In addition the flux return path because of its high permeability intensifies the magnetic field within the coil and it also shapes the field to render it much more uniform with the coil particularly near the ends so that a shorter coil might be used than if the flux return path were omitted.

The uniformity of heating of the heat exchanger assemblies is improved by avoiding or reducing radiation heat losses from certain external surfaces of the assembly. For example, heat radiated from the side plates 18 and the ends of the headers 12 would cause the side regions of the assembly to be cooler than the center. Steel end fixtures 39 are secured to the side plates to squeeze the tubes and fins together during brazing and also to be heated by the magnetic field to add a temperature near that of the assembly to reduce heat loss from the side plates 18, thereby serving as heat panels. Further, vertical auxiliary steel panels 35 with end portions 36 inwardly tilted toward the headers are mounted opposite the ends of the assemblies by supports, not shown, and are inductively heated by the magnetic field to a temperature near that of the assemblies so that a net heat loss by radiation from the ends of the headers 12 and side walls 18 to the cool coil 30 does not occur. When a plurality of assemblies are heated in side by side relationship the outside ones will tend to be cooler than inside ones due to the radiation losses and accordingly steel panels 37 are mounted at the sides of the outer radiator cores to prevent radiation losses in the same manner as the panels 35.

While it is known to use low frequencies for n heating the usual practice is to use magnetic fields alternating at the rate of several thousand hertz, inasmuch as more effective energy coupling to the workpiece occurs at high frequency. A characteristic of induction heating which is particularly noticeable at high frequencies is the skin effect which causes direct heating of the peripheral portions of a part and inner portions then are heated by conduction from the peripheral portion thereby resulting in substantial temperature differentials within a part. This phenomenon is advantageously used where localized surface heating is desired. For the present application the temperature differentials, of course, are undesirable and thus a low frequency should be used. The frequency is to be selected low enough to uniformly heat the part but not so low as to be unnecessarily inefficient. The alternating magnetic field induces current flows along the periphery of the element in the field. The current density is maximum at the edge and falls off exponentially with distance into the element. To calculate heating the effective value of the current density may be assumed constant extending one "skin depth" from the edge. In this case the "skin depth" δ is given by $$\delta = \sqrt{\frac{2\rho}{\omega\mu_o}}$$

where
$\rho$ = Effective material resistivity
$\omega$ = Angular frequency
$\mu_o$ = Permeability of material For uniform heating the skin depth δ should be larger than half the element width. For the heat exchanger specifically described above a frequency less than 800 Hz is required. A test made on the heat exchanger shows that frequencies between 200 and 800 Hz can be used with the lower frequency being less efficient. The optimum frequency was found to be 400–600 Hz.

It will thus be seen that the method is carried out by the apparatus of FIG. 4 by setting the axis of the coil at an angle A to the horizontal as discussed above to produce uniform heating in both the headers and tubes of the assembly 10 and supporting the assembly in the coil with the headers horizontal. The current alternating at 400–600 Hz is applied to the coil to heat the heat exchanger assembly. The chamber is evacuated to 1–10 microns of vacuum. The heating of the assembly may commence during the evacuation so that much of the temperature rise occurs during the evacuation process. The assembly is uniformly heated so that the brazing alloy fuses on the headers, the tubes and the side plates and flows into the joints between the tubes and headers and also to joints between the sinuous ribbons and the tubes or side plates. Then the magnetic field is turned off to allow the assembly to cool and the brazing alloy to solidify to complete the process, and atmospheric air is admitted to the chamber.

It will thus be seen that according to this invention a method is provided for carrying out induction brazing on an assembly which is not only complex in structure but also requires very uniform heating and a small brazing temperature range.

The embodiments of the invention in which an exclusive property or privilege is claimed are defined as follows:

1. A method of induction brazing an assembly including a plurality of elements consisting of core metal clad with a brazing metal which has a slightly lower melting point than the core metal, the elements being generally disposed in at least two transverse planes and intersecting at a junction to be brazed comprising the steps of:
    establishing an alternating magnetic field having flux lines extending in a preset direction,
    orienting the assembly in the magnetic field with the said planes positioned at respective angles to the flux lines, the angles being set to cause substantially equal inductive heating of the elements, and
    inductively heating the elements by said magnetic field to a uniform temperature sufficient to melt the cladding to form a brazed joint and insufficient to melt the core metal.

2. A method of induction brazing an assembly including a plurality of first and second elements intersecting at joints to be brazed and consisting of core metal clad with a brazing metal which has a slightly lower melting point than the core metal, the first elements being generally disposed in a first set of spaced parallel planes and the second elements being generally disposed in a second set of spaced parallel planes transverse to the first set of planes, comprising the steps of:
    establishing an alternating magnetic field having flux lines extending in a preset direction,
    orienting the assembly in the magnetic field with the said elements positioned at respective angles to the flux lines, the angles being set to cause inductive heating of the elements to a uniform temperature, and
    inductively heating the elements by said magnetic field to a uniform temperature sufficient to melt the cladding to form brazed joints and insufficient to melt the core metal.

3. A method of induction brazing an assembly including a plurality of first spaced parallel elements connected at joints by second spaced elements generally perpendicular to the first elements, the elements consisting of core metal clad with a brazing metal which has a slightly lower melting point than the core metal, comprising the steps of:
    establishing an alternating magnetic field having flux lines extending in a preset direction,
    orienting the assembly in the magnetic field with the said elements positioned at respective angles to the flux lines, the angles being set to cause substantially equal inductive heating of the elements, and
    inductively heating the elements by said magnetic field to a uniform temperature sufficient to melt the cladding to form brazed joints and insufficient to melt the core metal.

4. A method of induction brazing an assembly including a plurality of first spaced parallel elements connected at joints by second spaced parallel elements generally perpendicular to the first elements, the elements consisting of core metal clad with a brazing metal which has a slightly lower melting point than the core metal, comprising the steps of:
    orienting the assembly to position the first elements horizontally and the second elements vertically,
    establishing an alternating magnetic field having flux lines extending transversely through the first and second elements and at an oblique angle to the horizontal plane, the angle being selected to cause substantially equal inductive heating of the elements, and inductively heating the elements by said magnetic field to a uniform temperature sufficient to melt the brazing metal to form brazed joints and insufficient to melt the core metal.

5. A method of induction brazing an assembly including a plurality of elements consisting of core metal clad with a brazing metal which has a slightly lower melting point than the core metal, the elements being generally disposed in at least two transverse planes and intersecting at a junction to be brazed comprising the steps of:

establishing an alternating magnetic field having a frequency sufficiently low to substantially uniformly heat all portions of each element and having flux lines extending in a preset direction, orienting the assembly in the magnetic field with the said planes positioned at respective angles to the flux lines, the angles being set to cause substantially equal inductive heating of the elements, and inductively heating the elements by said magnetic field to a uniform temperature sufficient to melt the cladding to form brazed joints and insufficient to melt the core metal.

6. A method of induction brazing a plurality of assemblies each including a plurality of first and second elements intersecting at joints to be brazed and consisting of core metal clad with a brazing metal which has a slightly lower melting point than the core metal, the first elements being generally disposed in a first set of spaced parallel planes and the second elements being generally disposed in a second set of spaced parallel planes transverse to the first set of planes, wherein each element when heated radiates energy to another element or to another region of the environment so that certain outer assembly surfaces tend to suffer a net energy loss, comprising the steps of:

establishing an alternating magnetic field having flux lines extending in a preset direction, orienting the assemblies in the magnetic field the said elements positioned at respective angles to the flux lines, the angles being set to cause inductive heating of the elements to a uniform temperature, locating auxiliary metal panels opposite the said certain outer assembly surfaces for heating by the magnetic field to a temperature near that of the elements to transfer energy to the certain outer surfaces and prevent a net energy loss, thereby enhancing temperature uniformity throughout the assemblies, and inductively heating the elements by said magnetic field to a uniform temperature sufficient to melt the cladding to form brazed joints and insufficient to melt the core metal.

7. A method of induction brazing a heat exchanger assembly including a plurality of elements comprising a pair of parallel spaced headers with elongated transverse openings, a plurality of spaced parallel flat tubes normal to and extending between the headers and fitting within the openings, and a sinuous ribbon of thin metal in the space between and contacting each pair of flat tubes, the headers and tubes consisting of core metal clad with a brazing metal which has a slightly lower melting point than the core metal, wherein the tubes are to be brazed to the headers and the ribbons, comprising the steps of:

orienting the assembly with the said headers positioned horizontally and the tubes positioned vertically, establishing an alternating magnetic field with flux lines extending transversely through the elements and at an angle to the horizontal plane, the angle being set to cause substantially equal inductive heating of the elements, and inductively heating the elements by said magnetic field to a uniform temperature sufficient melt the cladding to form brazed joints and insufficient to melt the core metal.

* * * * *

UNITED STATES PATENT AND TRADEMARK OFFICE
CERTIFICATE OF CORRECTION

PATENT NO. : 4,443,678
DATED : April 17, 1984
INVENTOR(S) : Linos J. Jacovides and Edward J. Woods It is certified that error appears in the above—identified patent and that said Letters Patent is hereby corrected as shown below:

Col. 2, line 52, "side-" should read -- side --.

Col. 5, line 3, "n" should read -- induction --.

Col. 8, line 1, after "field," should be inserted -- with --.

Signed and Sealed this

Eleventh Day of September 1984

[SEAL]

Attest:

Attesting Officer

GERALD J. MOSSINGHOFF

Commissioner of Patents and Trademarks